United States Patent [19]
LLewellyn

[11] 3,929,003
[45] Dec. 30, 1975

[54] METHOD AND APPARATUS FOR DETECING MATERIALS IN A LIQUID

[75] Inventor: Peter M. LLewellyn, Menlo Park, Calif.

[73] Assignee: Varian Associates, Palo Alto, Calif.

[22] Filed: Nov. 15, 1971

[21] Appl. No.: 199,025

Related U.S. Application Data

[63] Continuation of Ser. No. 833,517, June 16, 1969, abandoned.

[52] U.S. Cl. .................... 73/61 R; 73/19; 73/61.1 R
[51] Int. Cl. .................... G01N 13/04; B01D 13/00
[58] Field of Search ............. 73/61 R, 23.1, 23, 19, 73/61.1 C; 250/43.5 R; 55/16, 158

[56] References Cited
UNITED STATES PATENTS

| | | | |
|---|---|---|---|
| 2,918,579 | 12/1959 | Slobod et al. | 250/43.5 |
| 2,966,235 | 12/1960 | Kammermeyer | 55/16 |
| 3,367,850 | 2/1968 | Johnson | 73/61.1 R UX |
| 3,398,505 | 8/1968 | Llewellyn | 73/23.1 X |
| 3,455,144 | 7/1969 | Bradley | 73/19 |

Primary Examiner—Richard C. Queisser
Assistant Examiner—Joseph W. Roskos
Attorney, Agent, or Firm—Stanley Z. Cole; Gerald M. Fisher

[57] ABSTRACT

A liquid carrier, such as water, containing trace amounts of material to be detected, such as organic materials, is passed through a first membrane separator for separating the liquid carrier from the material to be detected. The material to be detected passes through the membrane and is passed as a vapor into a permanent gas atmosphere on the downstream side thereof. The vaporized material to be detected is separated from the gaseous atmosphere by a second membrane separator and gas analyzed, as by a mass spectrometer, for detection. The system is useful for trace detection from liquids including mineral and oil prospecting in bodies of water including streams, rivers, lakes and oceans and in their tributaries and waterheads and for tracking fish and vessels in such bodies of water.

35 Claims, 3 Drawing Figures

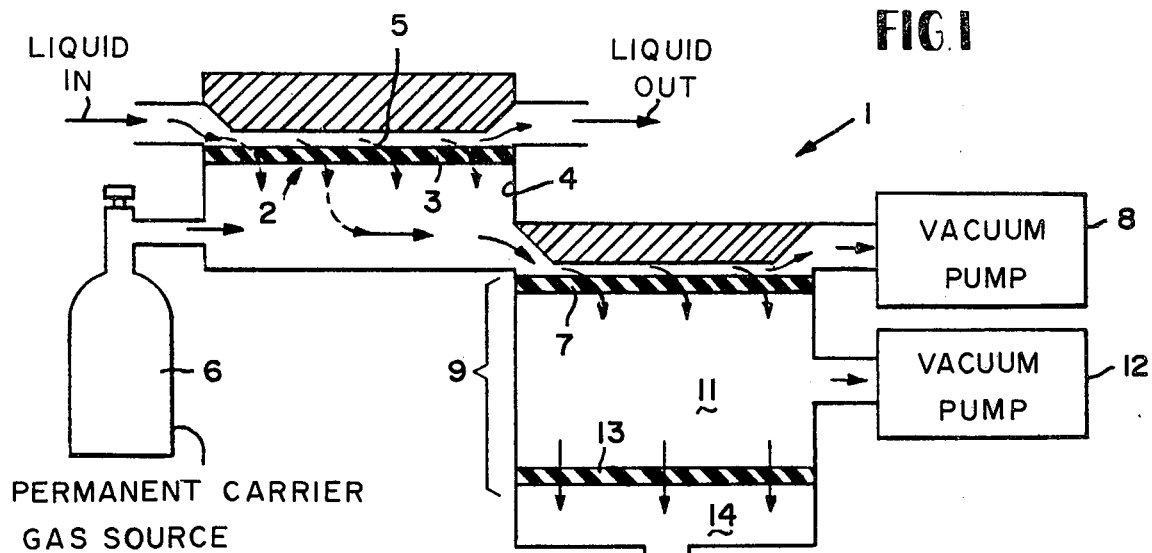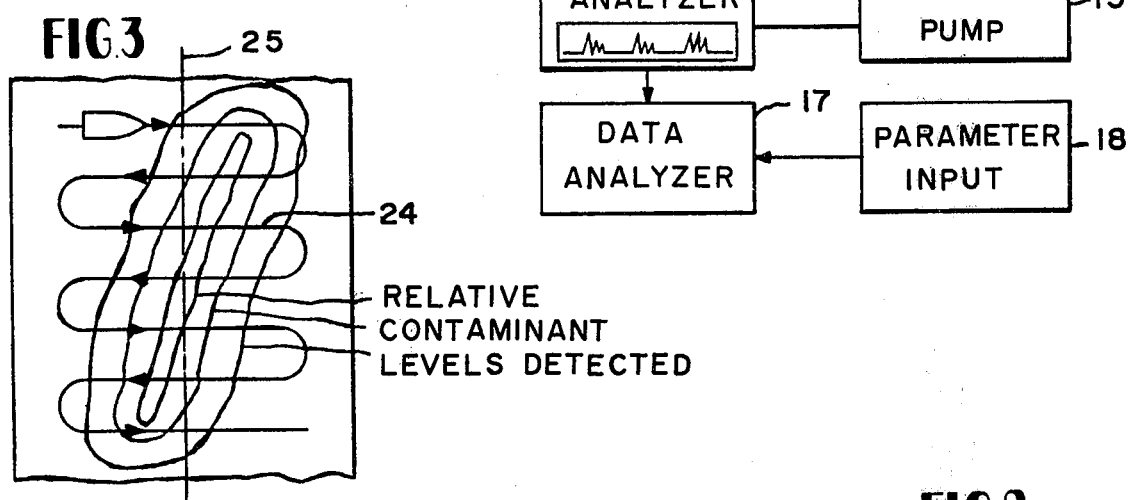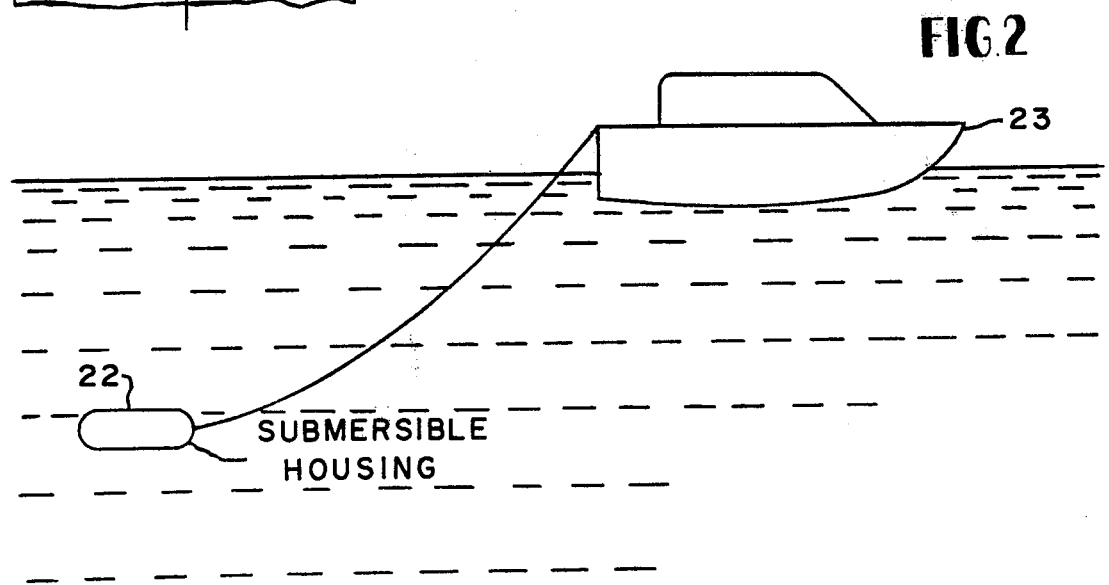

METHOD AND APPARATUS FOR DETECING MATERIALS IN A LIQUID

This is a continuation of application Ser. No. 833,517, filed June 16, 1969; now abandoned.

DESCRIPTION OF THE PRIOR ART

Heretofore, it has been proposed to detect extremely small traces of organic vapors in air and other permanent carrier gases by the provision of one or more membrane gas separators for enriching the organic concentration in the gas followed by a mass spectrometer for detection of the organic enriched gases. Permanent gases are those gases commonly found in air which have a boiling point substantially below 0°C. Such a gas detector is disclosed and claimed in U.S. Pat. No. 3,429,105, filed July 6, 1966 and assigned to the same assignee as the present invention.

It has been proposed to employ such a gas detection system in prospecting for oil and minerals by detecting the organic vapor contaminants in the atmosphere as contaminated by vapors given off by the underground oil or mineral deposits or by organic materials known to be associated with such deposits. Such a method for prospecting is disclosed and claimed in copending U.S. patent application Ser. No. 711,443, filed Mar. 7, 1968 and assigned to the same assignee as the present invention.

It is also known that large area membrane separators may be employed as a synthetic gill material for separating oxygen gas from sea water. This application is a continuation-in-part of the copending application of the same applicant, Ser. No. 511,756 filed Dec. 6, 1965 and now U.S. Pat. No. 3,455,092.

SUMMARY OF THE PRESENT INVENTION

The principal object of the present invention is the provision of an improved method and apparatus for detection of trace amounts of certain materials in a liquid carrier.

One feature of the present invention is the provision of a pair of membrane separators, a first one of the separators being exposed to the liquid carrier containing the trace of material to be detected such that the material to be detected passes through the first membrane separator as a vapor into a gaseous atmosphere to be separated therefrom by the second membrane separator for subsequent gas analysis and detection.

Another feature of the present invention is the same as the preceding feature wherein the liquid carrier is water sampled from a body of water suspected of containing a source of the trace material, such as fish, mineral deposits, oil or a vessel, which it is desired to locate, and wherein the samples are taken from the body of water in such a manner as to permit correlation of the sample position with detection of the certain trace material to derive information indicative as to the location of the source of such trace material.

Another feature of the present invention is the same as any one or more of the preceding features including the provision of a hydrophobic coating, as of wax or grease, on the liquid exposed side of the first membrane separator to inhibit passage of water vapor through the first separator.

Other features and advantages of the present invention will become apparent upon a perusal of the following specification taken in connection with the accompanying drawings wherein:

BRIEF DESCRIPTION OF THE DRAWINGS

FIG. 1 is a schematic line diagram, partly in block diagram form, of a detection system incorporating features of the present invention, FIG. 2 is schematic line diagram of a water-borne detection system of the present invention, and FIG. 3 is a contour map which may be developed using the present invention.

DESCRIPTION OF THE PREFERRED EMBODIMENTS

Referring now to FIG. 1, there is shown a detector system 1 employing features of the present invention. The detector system 1 includes a first membrane separator 2 formed by a membrane 3, as of silicone rubber 1 mil thick and of the general type disclosed in copending U.S. patent application Ser. No. 511,756, filed Dec. 6, 1965, now U.S. Pat. No. 3,455,092, and assigned to the same assignee as the present invention. The membrane 3 can be self-supporting or it may comprise a film of material supported on a porous glass substrate. The membrane 3 is sealed over the end of a gas passageway 4 in fluid tight relation therewith.

Liquid, such as water, carrying a trace of contaminant material to be detected, such as an organic hydrocarbon of the general type $C_{10-12}H_{16-18}O$ characteristic of flavors, fragrances, or $C_{6-10}H_{14-22}$ characteristic of oils, gasoline, etc., is directed over the outer surface of the membrane 3. The organic material goes into solution with the material of the membrane 3 and diffuses through the membrane 3 into the gas passageway 4, whereas the membrane 3 is relatively impervious to the liquid carrier, such as water. Thus, the membrane 3 acts as a relatively impervious barrier to the liquid carrier while appearing semipermeable to the contaminant organic trace constituents of the liquid. The outer surface of the membrane may also be coated with a hydrophobic layer of grease or wax 5 to further impede passage of the liquid through the membrane 3 while not appreciably impeding the passage of such organic trace materials through the membrane 3.

The organic materials to be detected pass through the membrane 3 and enter a gaseous atmosphere in the gas passageway 4 in the vapor state at a reduced pressure. The organic vapors within passageway 4 may enter a carrier gas stream of permanent gases, such as air, $CO_2$, nitrogen, etc., supplied from a carrier gas source 6 to be carried by such gas steam over a second similar gas separating membrane 7 to a vacuum pump 8. Alternatively, the organic vapors in passageway 4, which are accompanied by permanent gases such as $O_2$ and $CO_2$ extracted from the water via membrane 3, may be pulled therethrough over membrane 7 via the vacuum pump 8, in which case source 6 is valved off.

The second membrane 7 is a first membrane of a two stage gas separator 9 of the general type claimed in the aforecited U.S. Pat. No. 3,429,105. The organic vapors pass through the first gas separating membrane 7 into chamber 11, at a pressure, as of $10^{-3}$ torr, which is pumped on by vacuum pump 12. The organic vapor concentration in chamber 11 is enriched by a substantial factor, as of 500, compared to the concentration of such vapors in passageway 4. The organic vapors in chamber 11 are caused to pass over a second gas separating membrane 13 for further gas separation and enrichment as such vapors pass through membrane 13 into chamber 14. Chamber 14 is evacuated to a relatively low pressure, as of $10^{-6}$ torr, via vacuum pump 15, which communicates with chamber 14 via the vacuum envelope of a gas analyzer 16, such as a mass spectrometer, which is also thereby evacuated to approximately $10^{-6}$ torr. The second gas separating membrane 13 further enriches the concentration of the organic vapors to be detected in the gas stream which is fed to the gas analyzer 16, by another factor of 500.

The gas analyzer 16 analyzes the mixture of gases at the output of the gas separator 9 for detection and identification of the organic vapors. The detected organic vapors may be displayed on the conventional recorder of the gas analyzer 16 to give the operator an indication of their presence, composition or identity, and relative concentration. This information may also be fed to a data analyzer 17, such as a computer, for correlation with other data derived from a parameter input 18, such as location of the sampling points, temperature, pressure, course and velocity of the detection system. The computer may be employed for plotting organic contaminant concentration contour maps of the general type depicted in FIG. 3.

The contaminant detection system of FIG. 1 is extremely sensitive. For example, with 10 cc of water per second being directed over the input membrane 3, as little as one part in $10^{12}$ organic contaminant may be detected and identified.

The detection system of FIG. 1 may be employed in a number of methods of prospecting for mineral and oil deposits, and for tracking vessels and fish. More particularly, certain oil and mineral deposits give off or have associated therewith certain organic materials which work their way through the earth formations in which they are located and effuse into nearby bodies of water which can be sampled such as overlying streams, lakes or oceans. Alternatively, such organics may effuse into underground streams or percolating water which can be tapped and sampled. In the case of overlying bodies of water, the detection system of FIG. 1 may be disposed in a submersible housing 22 (see FIG. 2) and towed through the body of water by a boat 23 over a predetermined path, such as path 24 (see FIG. 3). The organic contaminant concentration levels as detected by the detection system 1, are plotted in the form of a contour map, as shown in FIG. 3, to give an indication as to the location of the mineral or oil deposit.

In the case of prospecting or pollution surveillance by sampling moving water, such as streams, run off from rain and snow, and percolating water, the moving water is sampled at a number of locations along its known path. The detected organic contaminant levels are correlated with the sampling locations to give an indication as to the location of the source of contamination.

Fish, mammals, and vessels which move through a body of water leave behind a trail of certain organic contaminant materials, such as indicated by line 25 of FIG. 3. Such moving sources of contamination can be identified, tracked and located by sampling the water for certain characteristic organic contaminants and correlating the contaminant concentration levels with the sampling track or points, as indicated by track 24 of FIG. 3, to locate and follow the trail of contamination to the source thereof.

Since many changs could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. In a method for detecting trace quantities of a material in a liquid carrier of a body liquid the steps of, separating the material from the liquid carrier beneath the surface of the body of liquid passing the separated material above the surface of the body of liquid as a vapor into a carrier gaseous atmosphere, separating the vaporized material from the carrier gaseous atmosphere, and detecting the separated vaporized material.

2. The method of claim 1 wherein the steps are performed continuously.

3. The method of claim 1 wherein the material to be detected is an organic material, the liquid carrier is water, and the first and second steps of separating the organic material comprise causing the organic material to go into solution with a barrier membrane separator material such that the organic material diffuses through the membrane separator material at a much faster rate than the carrier material from which it is to be separated, thereby substantially enriching the concentration of the organic material in the material which passes through the membrane separators.

4. In a method for locating the source of a certain contaminate in a body of water the steps of, sampling the water at a plurality of points, separating the contaminant from the sampled water beneath the surface of the body of water by passing the contaminant through a generally water impervious membrane within the body of water which is at least semipermeable to the contaminant, diffusing the separated contaminant in a vaporized state into a carrier gas atmosphere, separating the contaminant vapor from the carrier gas atmosphere by passing the contaminant through a generally carrier gas impervious membrane which is at least semipermeable to the contaminant, diffusing the separated contaminant in a vaporized state into a carrier gas atmosphere, separating the contaminant vapor from the carrier gas atmosphere by passing the contaminant through a generally carrier gas impervious membrane which is at least semipermeable to the contaminant to enrich the contaminant concentration in the atmosphere on the downstream side of the membrane, analyzing the contaminant enriched atmosphere to detect the presence of the contaminant, and correlating the presence of the detected contaminant with the respective sampling points to derive an indication of the location of the source of the certain contaminant.

5. The method of claim 4 including the step of traversing a path relative to the body of water while sampling the water at the plurality of points on the path, recording the path traversed, and correlating the detected presence of the contaminant with the recorded path and sampling points to derive the indication of the location of the source of the contaminant.

6. In a method for prospecting for certain mineral deposits the steps of, traversing a predetermined path over a body of water suspected of overlying certain mineral deposits, sampling the water during the traverse at a plurality of points, exposing the sampled water to a membrane separator located beneath the surface of the body of water for separating from the water a certain contaminant within the body of water thereof known to be associated with the certain mineral deposits to be located, diffusing the separated contaminant as a vapor into a gaseous atmosphere, exposing the contaminant carrying gaseous atmosphere to a second membrane separator for enriching the concentration of the contaminant in the gaseous atmosphere passing through the second membrane separator, detecting the presence of the contaminant in the contaminant enriched atmosphere as passed through the second membrane separator, correlating the detected presence of the contaminant with the sampling points on the path traversed to derive an indication of the location of the mineral deposit.

7. In a method for tracking down a source of contamination in a body of water where there is relative movement between the source and the body of water such that the source leaves a trail of a certain organic contaminant in the water the steps of, sampling the water at a plurality of points, separating the organic contaminant from the sampled water by passing the organic contaminant through a generally water impervious membrane, located beneath the surface of the body of water, diffusing the separated organic contaminant in a vaporized state into a carrier gas atmosphere, separating the organic contaminant vapor from the carrier gas atmosphere by passing the organic contaminant vapor through a second membrane which is relatively impervious to the carrier gas to enrich the organic contaminant concentration in a gaseous atmosphere on the downstream side of the second membrane, analyzing the contaminant enriched atmosphere to detect the presence of the organic contaminant, and correlating the detected presence of the organic contaminant with the position of the respective sampling points to derive a track for the source of contamination.

8. The method of claim 7 wherein the source of contamination is a fish or mammal moving through the body of water.

9. The method of claim 7 wherein the source of contamination is a vessel moving through the body of water.

10. The method of claim 7 wherein the source of contamination is associated with a mineral or oil deposit and the body of water is moving.

11. In an apparatus for detecting the presence of trace quantities of material in a liquid carrier means forming a first membrane separator having a first separating membrane, means for exposing one side of said first separating membrane to the carrier liquid containing trace quantities of material to be detected, said first separating membrane being made of a material which is semipervious to the material to be detected and relatively impervious to the liquid carrier, means for producing a gaseous atmosphere on the downstream side of said first separating membrane such that the material to be separated which passes through the separating membrane enters the gaseous atmosphere in a vaporized state, means forming a second membrane separator having a second separating membrane with one side thereof exposed to the gaseous atmosphere containing the vaporized material to be detected, said second separating membrane being made of a material which is semipermeable to the material to be detected and relatively impervious to the other constituents of the gaseous atmosphere containing the vaporized material to be detected such that the concentration of the material to be detected is enriched in the gas stream passing through said second separating membrane, means on the downstream side of said second separating membrane for analyzing the gas stream for detection of the material to be detected and including a means forming a submersible housing for containing at least said first membrane separator, and means for submersing said submersible housing and said first membrane separator in the carrier liquid.

12. The apparatus of claim 11 wherein said means for producing a gaseous atmosphere on the downstream side of said first separating membrane includes means for producing a carrier gas stream into which the vaporized material to be detected is introduced by passage thereof through said first separating membrane.

13. The apparatus of claim 12 wherein said means for analyzing the enriched gas stream is a mass spectrometer, and including means for evacuating said mass spectrometer.

14. The apparatus of claim 11 wherein the liquid carrier is water and the material to be detected is organic, said first separating membrane including a coating of hydrophobic material thereon facing the water carrier and serving as an additional barrier for water tending to pass through said first separating membrane.

15. The apparatus of claim 11 including a third membrane separator disposed between said second membrane separator and said gas analyzer means for further enriching the concentration of the material to be detected in the gas stream passing to said gas analyzer means.

16. In a method for detecting trace quantities of a non-permanent gas material in a liquid carrier the steps of, separating said trace material from the liquid carrier by bringing the liquid carrier containing the material into contact with a first membrane, passing said separated trace material as a vapor into a permanent gas atmosphere, separating said vaporized trace material from said permanent gas atmosphere, and detecting said separated vaporized trace material.

17. The method of claim 16 wherein the steps are performed continuously.

18. The method of claim 16 wherein the trace material to be detected is an organic material and the first and second steps of separating the trace material comprise causing said organic material to go into solution with a barrier membrane separator material such that the organic material diffuses through the membrane separator material at a much faster rate than said permanent gas from which it is to be separated, thereby substantially enriching the concentration of the organic material in the material which passes through the membrane separators.

19. A method for detecting trace quantities of a material in a liquid carrier comprising the steps of separating the material from the liquid carrier by bringing the liquid carrier containing the material into contact with a first membrane separator, passing the material which diffused through the first separator as a vapour into a carrier gaseous atmosphere, concentrating the vaporized material with respect to the carrier gaseous atmosphere by bringing the carrier gas containing the diffused material into contact with a second membrane separator, and detecting the concentrated vaporized material which diffused through the second separator.

20. The method of claim 19 wherein the material being detected is an organic material.

21. A method for using a silicone membrane means as an inlet device for a mass analyzer for analyzing trace quantities of non-permanent gas material being carried in a liquid, including the steps of bringing said liquid into contact with said silicone membrane means for separating and concentrating said non-permanent gas material, passing the gases which diffuse through said silicone membrane means to a mass analyzer, and detecting the concentrated non-permanent gas material which have diffused through said silicone membrane means in said mass analyzer.

22. The method of claim 21 wherein the step of passing the gases which diffuse through said membrane means to a mass analyzer includes passing said gases through a first and second membrane to said mass analyzer.

23. The method of claim 21 wherein said mass analyzer is a mass spectrometer.

24. A method for using a hydrophobic silicone polymer membrane means as an inlet device for a mass analyzer for analyzing trace quantities of non-permanent gas material being carried in a liquid, including the steps of bringing said liquid into contact with said hydrophobic silicone polymer membrane means for separating and concentrating said non-permanent gas material, passing the gases which diffuse through said hydrophobic silicone polymer membrane means to a mass analyzer, and detecting the concentrated non-permanent gas material which have diffused through said hydrophobic silicone polymer membrane means in said mass analyzer.

25. The method of claim 24 wherein the step of passing the gases which diffuse through said membrane means includes passing said gases through a first and second membrane to said mass analyzer.

26. The method of claim 24 wherein said nonpermanent gas material is an organic material.

27. A method for using an inorganic polymer membrane means as an inlet device for a mass analyzer for analyzing trace quantities of non-permanent gas material being carried in a liquid, including the steps of bringing said liquid into contact with said inorganic polymer membrane means for separating and concentrating said non-permanent gas material, passing the gases which diffuse through said inorganic polymer membrane means to a mass analyzer, and detecting the concentrated non-permanent gas material which have diffused through said inorganic polymer membrane means in said mass analyzer.

28. The method of claim 26 wherein the step of passing the gases which diffuse through said membrane means includes passing said gases through a first and second membrane to said mass analyzer.

29. The method of claim 27 wherein said nonpermanent gas material is an organic material.

30. A method for using a silicone polymer membrane means as an inlet device for an analyzer means for analyzing trace quantities of non-permanent gas material being carried in a liquid including the steps of bringing said liquid into contact with said silicone polymer membrane means for separating and concentrating said non-permanent gas material, passing the gases which diffuse through said polymer membrane means to said analyzer means, and detecting the concentrated nonpermanent gas material which have diffused through said silicone polymer membrane means in said analyzer means.

31. The method of claim 30 wherein the step of passing the gases which diffuse through said membrane means includes passing said gases through a first and second membrane to said analyzer.

32. The method of claim 30 wherein said nonpermanent gas material is an organic material.

33. A method for using an inorganic polymer membrane means as an inlet device for an analyzer means for analyzing trace quantities of non-permanent gas material being carried in a liquid including the steps of bringing said liquid into contact with said inorganic polymer membrane means for separating and concentrating said non-permanent gas material, passing the gases which diffuse through said polymer membrane means to said analyzer means, and detecting the concentrated non-permanent gas material which have diffused through said inorganic polymer membrane means in said analyzer means.

34. The method of claim 30 wherein the step of passing the gases which diffuse through said membrane means includes passing said gases through a first and second membrane to said analyzer.

35. The method of claim 33 wherein said nonpermanent gas material is an organic material.

* * * * *